US011558407B2

(12) United States Patent
Cassidy et al.

(10) Patent No.: US 11,558,407 B2
(45) Date of Patent: Jan. 17, 2023

(54) ENTERPRISE POLICY TRACKING WITH SECURITY INCIDENT INTEGRATION

(71) Applicant: DEFENSESTORM, INC., Seattle, WA (US)

(72) Inventors: Sean Cassidy, Seattle, WA (US); Alejandro Hernandez, Seattle, WA (US); Darryl J. Landreneau, Seattle, WA (US); Edgardo Nazario, Seattle, WA (US)

(73) Assignee: Defensestorm, Inc., Alpharetta, GA (US)

( * ) Notice: Subject to any disclaimer, the term of this patent is extended or adjusted under 35 U.S.C. 154(b) by 308 days.

(21) Appl. No.: 16/075,563

(22) PCT Filed: Feb. 3, 2017

(86) PCT No.: PCT/US2017/016462
§ 371 (c)(1),
(2) Date: Aug. 3, 2018

(87) PCT Pub. No.: WO2017/136695
PCT Pub. Date: Aug. 10, 2017

(65) Prior Publication Data
US 2019/0052660 A1 Feb. 14, 2019

Related U.S. Application Data

(60) Provisional application No. 62/292,056, filed on Feb. 5, 2016.

(51) Int. Cl.
H04L 43/067 (2022.01)
H04L 9/40 (2022.01)
(Continued)

(52) U.S. Cl.
CPC .......... *H04L 63/1425* (2013.01); *G06F 21/50* (2013.01); *G06F 21/54* (2013.01);
(Continued)

(58) Field of Classification Search
CPC ............... H04L 63/1425; H04L 43/067; H04L 63/1416; H04L 63/20; G06F 21/50; G06F 21/55; G06F 21/54; G06F 21/554
See application file for complete search history.

(56) References Cited

U.S. PATENT DOCUMENTS 7,167,983 B1 * 1/2007 Tiller ..................... G06Q 10/06
713/166
7,478,422 B2 * 1/2009 Valente ............... H04L 41/0609
726/4

(Continued)

FOREIGN PATENT DOCUMENTS

EP        2779572 A1    9/2014
WO   WO-2017136695 A1   8/2017

OTHER PUBLICATIONS

Sunil Gupta, "Logging and Monitoring to Detect Network Intrusions and Compliance Violations in the Environment", 2012, obtained online from <https://www.sans.org/reading-room/whitepapers/detection/logging-monitoring-detect-network-intrusions-compliance-violations-environment-33985>, retrieved on Aug. 31, 2020.*

(Continued)

Primary Examiner — Jeffery L Williams
Assistant Examiner — Zhimei Zhu
(74) Attorney, Agent, or Firm — Morris, Manning & Martin, LLP; Daniel E. Sineway, Esq.; Adam J. Thompson, Esq.

(57) ABSTRACT

The present invention relates to methods, processes, and systems for monitoring security policy violations in a computer network. Details of such monitoring include creating (Continued)

a rule according to a security policy, determining if the rule is violated by a value of a variable, and recording security events and comparing the number of events to a threshold.

21 Claims, 6 Drawing Sheets

(51) Int. Cl.
    *G06F 21/50*     (2013.01)
    *G06F 21/55*     (2013.01)
    *G06F 21/54*     (2013.01)

(52) U.S. Cl.
    CPC ............ *G06F 21/55* (2013.01); *G06F 21/554* (2013.01); *H04L 43/067* (2013.01); *H04L 63/1416* (2013.01); *H04L 63/20* (2013.01)

(56) References Cited

U.S. PATENT DOCUMENTS

| | | | |
|---|---|---|---|
| 7,490,073 B1* | 2/2009 | Qureshi | G06N 5/048 706/56 |
| 7,546,637 B1* | 6/2009 | Agbabian | H04L 63/20 709/223 |
| 8,015,114 B1* | 9/2011 | Nachenberg | G06F 21/564 705/59 |
| 9,215,240 B2 | 12/2015 | Merza et al. | |
| 2002/0112185 A1 | 8/2002 | Hodges et al. | |
| 2003/0084349 A1* | 5/2003 | Friedrichs | H04L 63/1408 726/22 |
| 2004/0250169 A1* | 12/2004 | Takemori | H04L 63/1425 714/38.1 |
| 2006/0026688 A1* | 2/2006 | Shah | H04L 41/28 726/25 |
| 2006/0174342 A1* | 8/2006 | Zaheer | H04L 63/1441 726/23 |
| 2006/0265748 A1* | 11/2006 | Potok | G06F 21/552 726/23 |
| 2009/0089252 A1* | 4/2009 | Galitsky | G06F 16/245 |
| 2009/0300156 A1* | 12/2009 | Yalakanti | H04L 41/0806 709/223 |
| 2010/0010926 A1 | 1/2010 | Eckert et al. | |
| 2011/0055891 A1* | 3/2011 | Rice | G06F 21/6218 726/2 |
| 2012/0109985 A1* | 5/2012 | Chandrasekaran | G06F 16/24544 707/754 |
| 2012/0143650 A1* | 6/2012 | Crowley | H04L 41/28 705/7.28 |
| 2013/0007836 A1* | 1/2013 | Stevenson | G06F 21/566 726/1 |
| 2013/0275303 A1 | 10/2013 | Fiore | |
| 2013/0293363 A1* | 11/2013 | Plymouth | G06Q 20/10 340/309.16 |
| 2014/0156711 A1* | 6/2014 | Sharan | G06F 16/212 707/804 |
| 2014/0165200 A1* | 6/2014 | Singla | G06F 21/56 726/23 |
| 2014/0331277 A1* | 11/2014 | Frascadore | H04L 63/104 726/1 |
| 2015/0106930 A1* | 4/2015 | Honda | H04L 63/1433 726/23 |
| 2015/0172321 A1* | 6/2015 | Kirti | H04L 63/1416 726/1 |
| 2015/0229662 A1* | 8/2015 | Hitt | H04L 63/1433 726/23 |
| 2015/0254158 A1* | 9/2015 | Puri | G06F 11/3089 714/37 |
| 2015/0264008 A1* | 9/2015 | Li | H04L 43/00 709/245 |
| 2015/0269383 A1* | 9/2015 | Lang | H04L 63/20 726/1 |
| 2015/0319185 A1* | 11/2015 | Kirti | H04L 67/306 726/23 |
| 2015/0347999 A1 | 12/2015 | Lan | |
| 2016/0005044 A1* | 1/2016 | Moss | G06Q 20/4016 705/44 |
| 2016/0205126 A1* | 7/2016 | Boyer | H04L 63/1433 726/25 |
| 2016/0321649 A1 | 11/2016 | Dragushan | |
| 2016/0328562 A1* | 11/2016 | Saxena | G06F 21/56 |
| 2016/0337385 A1* | 11/2016 | Fujishima | H04L 63/1425 |
| 2016/0344736 A1* | 11/2016 | Khait | G06F 21/335 |
| 2017/0041296 A1* | 2/2017 | Ford | H04W 12/06 |
| 2017/0054854 A1* | 2/2017 | Richards | H04L 47/10 |
| 2017/0109639 A1* | 4/2017 | Marcu | G06F 11/368 |
| 2017/0163655 A1 | 6/2017 | Ramalingam | |
| 2017/0178025 A1* | 6/2017 | Thomas | G06N 5/025 |
| 2017/0178026 A1* | 6/2017 | Thomas | G06N 5/046 |
| 2017/0255939 A1* | 9/2017 | Quentin | G06Q 20/3224 |
| 2017/0352034 A1 | 12/2017 | Yu | |
| 2017/0357971 A1 | 12/2017 | Pitz | |
| 2018/0027006 A1* | 1/2018 | Zimmermann | H04L 63/0245 726/11 |
| 2018/0046811 A1* | 2/2018 | Andriani | H04L 63/1425 |
| 2020/0250184 A1* | 8/2020 | Frampton | H05K 999/99 |

OTHER PUBLICATIONS

YannK, "how to trigger alert if exceeds more than 100 times of 403 status code in a second", Jun. 19, 2014, obtained online from <https://community.splunk.com/t5/Alerting/how-to-trigger-alert-if-exceeds-more-than-100-times-of-403/m-p/111382>, retrieved on Sep. 20, 2021 (Year: 2014).*

International search report with written opinion dated Apr. 17, 2017 for PCT/US17/16462.

* cited by examiner

ENTERPRISE POLICY TRACKING WITH SECURITY INCIDENT INTEGRATION

CROSS REFERENCE

This application is a U.S. National Phase Application under 35 U.S.C. § 371 of International Application No. PCT/US2017/016462, filed Feb. 3, 2017, which claims the benefit of U.S. Provisional Patent Application No. 62/292,056, filed Feb. 5, 2016, the disclosures of which are herein incorporated by reference in their entireties.

BACKGROUND OF THE INVENTION

Network security is a concern for enterprises working with sensitive data, as well as enterprises running networks that can be targets for attack from outside. Security policies can be created to address risks to a computer network, but implementation and enforcement of the policies can be difficult. Accordingly, systems and methods for implementing and tracking security policy coverage, objectively assessing policy effectiveness, and assessing potential security threats are desirable.

SUMMARY

Provided herein are methods for monitoring security policy violations in a computer network. The methods can comprise: creating a rule corresponding to a security policy; determining a variable from the rule, wherein the variable is enabled to be set to a plurality of values, and the rule is violated or not violated conditional on the value of the variable. A log associated with the computer network is received, and the log is parsed to determine the value of the variable. The rule is evaluated conditional on the variable, and a rule violation is identified corresponding to the value of the variable and the rule. A security event corresponding to the rule violation is generated, and information representing the security event is recorded to a computer-readable storage medium.

In some embodiments, the security event comprises a plurality of security events. A time associated with each security event of the plurality of security events can be recorded. The method can further comprise the step of checking for an anomaly.

In some embodiments, checking for an anomaly comprises: identifying a time period; dividing the time period into a plurality of time bins; assigning each of the plurality of security events to a corresponding time bin; determining a number of security events assigned to each of the plurality of time bins; and generating a predicted event range for a time bin of the plurality of time bins based on the pattern of security events assigned to each of the plurality of time bins earlier than the time bin. The time bin is marked as anomalous if the number of security events assigned to the time bin does not fall within the predicted event range; otherwise the time bin is marked as not anomalous.

In some embodiments, checking for an anomaly comprises: identifying a time period; dividing the time period into a plurality of time bins; assigning each of the plurality of security events to a corresponding time bin; and determining a number of security events assigned to each of the plurality of time bins. The time bin is marked as anomalous if the number of security events assigned to the time bin does not fall within a user-defined event range; otherwise the time bin is marked as not anomalous.

The variable determined from the rule can represent an IP address, and a geographic coordinate can be associated with the IP address. The method can comprise the further steps of: identifying a plurality of geographic regions; associating each security event with a geographic region based on the geographic coordinate; identifying a time period; generating, from a statistical distribution of past security events associated with a geographic region of the plurality of geographic regions, an expected range of security events for the time period; and determining that the number of security events occurring within the time period and associated with the geographic region lies outside the expected range. The method can further comprise generating a security alert indicating that the number of security events occurring within the time period and associated with the geographic region lies outside the expected range.

A further step can comprise collecting statistical information related to the plurality of security events. A report can be generated based on the statistical information that is collected. Among the information reflected by the report can be at least one of a response rate, a number of security events per security policy, a number of security alerts per security policy, or a percentage of policies covered by rules. The statistical information can be compared with one or more sets of statistical information relating to other networks, and the network can be ranked in relation to the other networks based on one or more statistical categories. The one or more statistical categories can comprise a triage time, a response rate, a number of security events per unit time, or a number of security alerts per unit time.

In some embodiments, the information representing the security event comprises an IP address or a host name, and recording the information comprises adding the information to a relational database. The relational database can indicate which IP addresses or host names were identified in each of a plurality of days.

In some embodiments, a network topology identifying one or more segments of the network can be received.

In some embodiments, the security event can be queried against one or more classifying queries. One or more specified actions can be taken based on the classifying query, wherein the one or more specified actions comprises adding metadata to the security event, rewriting the security event, dropping the security event, or sending an alert related to the security event.

Further steps can comprise: identifying a security task to be periodically performed; identifying a repetition period for the security task; generating, in a plurality of repetition periods, a plurality of notifications to perform the security task, at a rate of one notification per repetition period; receiving user input for each of the plurality of repetition periods indicating whether the security task has been performed for that repetition period; and recording to a computer-readable medium, for each of the plurality of repetition periods, information indicating whether the security task has been performed in that repetition period.

In another aspect, disclosed herein is a system for monitoring violations of security policies, the system comprising a computer network, a computer-readable storage medium, a processor, and memory. The memory includes instructions executable by the processor to cause the system to perform at least the following operations: A rule is created corresponding to a security policy, and a variable is determined from the rule. The variable is enabled to be set to a plurality of values, and the rule is violated or not violated conditional on the value of the variable. A log associated with the computer network is received, and the log is parsed to determine the value of the variable. The rule is evaluated conditional on the variable, and a rule violation is identified corresponding to the value of the variable and the rule. A security event corresponding to the rule violation is generated, and information representing the security event is recorded to a computer-readable storage medium.

In some embodiments, the security event comprises a plurality of security events. A time associated with each security event of the plurality of security events can be recorded. Further instructions that can be executed from memory include instructions to check for an anomaly.

In some embodiments, checking for an anomaly comprises: identifying a time period; dividing the time period into a plurality of time bins; assigning each of the plurality of security events to a corresponding time bin; determining a number of security events assigned to each of the plurality of time bins; and generating a predicted event range for a time bin of the plurality of time bins based on the pattern of security events assigned to each of the plurality of time bins earlier than the time bin. The time bin is marked as anomalous if the number of security events assigned to the time bin does not fall within the predicted event range; otherwise the time bin is marked as not anomalous.

In some embodiments, checking for an anomaly comprises: identifying a time period; dividing the time period into a plurality of time bins; assigning each of the plurality of security events to a corresponding time bin; and determining a number of security events assigned to each of the plurality of time bins. The time bin is marked as anomalous if the number of security events assigned to the time bin does not fall within a user-defined event range; otherwise the time bin is marked as not anomalous.

The variable determined from the rule can represent an IP address, and a geographic coordinate can be associated with the IP address. The memory can comprise instructions to: identify a plurality of geographic regions; associate each security event with a geographic region based on the geographic coordinate; identify a time period; generate, from a statistical distribution of past security events associated with a geographic region of the plurality of geographic regions, an expected range of security events for the time period; and determine that the number of security events occurring within the time period and associated with the geographic region lies outside the expected range. The memory can further comprise instructions to generate a security alert indicating that the number of security events occurring within the time period and associated with the geographic region lies outside the expected range.

The system can be further configured to collect statistical information related to the plurality of security events. The system can generate a report based on the statistical information, wherein the report reflects at least one of a response rate, a number of security events per security policy, a number of security alerts per security policy, or a percentage of policies covered by rules. The system can further compare the statistical information with one or more sets of statistical information relating to other networks.

In some embodiments, the system comprises a relational database. The information representing the security event can comprise an IP address or a host name, and recording information representing the security event comprises adding the information to the relational database. In some embodiments, the relational database indicates which IP addresses or host names were identified in each of a plurality of days.

The system can be further configured to receive a network topology identifying one or more segments of the network.

In some embodiments, the system is further configured to query the security event against one or more classifying queries. The system can be configured to take one or more specified actions based on the classifying query. The one or more specified actions can comprise adding metadata to the security event, rewriting the security event, dropping the security event, or sending an alert related to the security event.

In some embodiments, the system ranks the network in relation to the other networks based on one or more statistical categories. The one or more statistical categories can comprise a triage time, a response rate, a number of security events per unit time, or a number of security alerts per unit time.

In some embodiments, the memory further comprises instructions to: receive input identifying a security task to be periodically performed; receive input identifying a repetition period for the security task; generate, in a plurality of repetition periods, a plurality of notifications to perform the security task, at a rate of one notification per repetition period; receive user input for each of the plurality of repetition periods indicating whether the security task has been performed for that repetition period; and record to a computer-readable medium, for each of the plurality of repetition periods, information indicating whether the security task has been performed in that repetition period.

Aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

While various embodiments and examples of the invention have been shown and described herein, it will be obvious to those skilled in the art that such embodiments are provided by way of example only. Numerous variations, changes, and substitutions can occur to those skilled in the art without departing from the invention. It should be understood that various alternatives to the embodiments and examples of the invention described herein can be employed. It shall be understood that different aspects of the invention can be appreciated individually, collectively, or in combination with each other.

As used herein A and/or B encompasses one or more of A or B, and combinations thereof such as A and B.

As used herein a computer encompasses a device with a processor, which can be coupled to a display.

The various techniques described herein can be partially or fully implemented using code that is storable upon storage media and computer-readable media, and executable by one or more processors of a computer system. The processor can comprise array logic such as programmable array logic (hereinafter PAL), configured to perform the techniques described herein. Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

As described herein, methods of monitoring security violations can include creating one or more rules corresponding to one or more security policies; determining, by analyzing log files associated with the network, which of the one or more rules have been violated, and generating security events corresponding to the rule violations.

Figure 1:
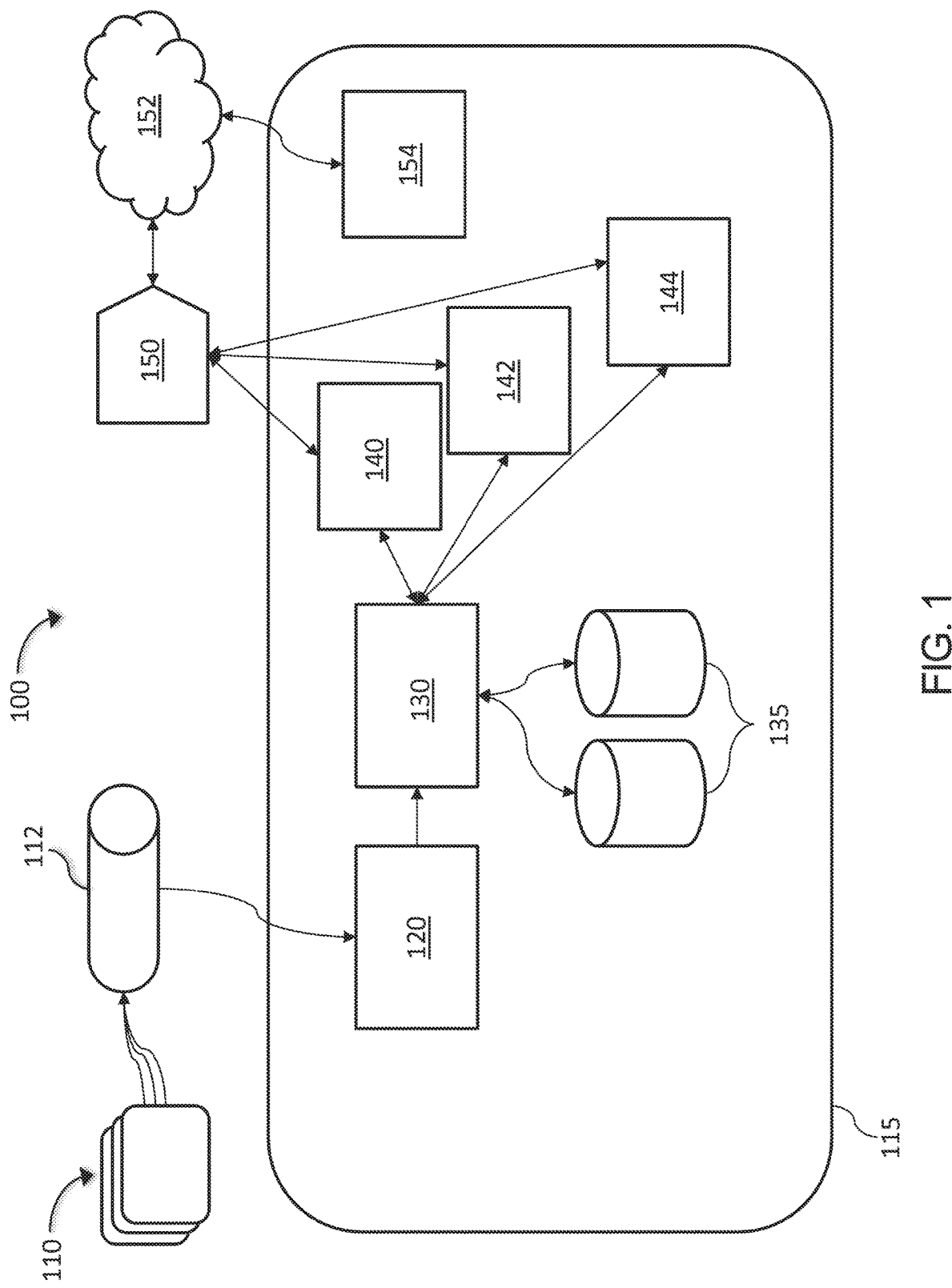
FIG. 1 illustrates an exemplary network system architecture for monitoring security policy violations in a computer network, in accordance with embodiments.

FIG. 1 illustrates a network system architecture 100 for monitoring security policy violations in a computer network 110. A computer network 110 is chosen to provide network monitoring services, which can include such services as computer usage monitoring, network connection monitoring, and network resource usage monitoring. The computers of computer network 110 each comprise one or more processors, and software is provided to be executed by these processors, enabling each computer to perform basic network monitoring tasks, such as recording packet transmission information, resource usage information, email and other messaging traffic, and computer usage information. Each type of information is recorded as a log file for transmission to a central server. For example, a log file can be generated in response to an incoming packet received by one of the computers. The log file can contain information representative of the packet's contents and other properties, such as its sender, recipient, port, and time of receipt. In some cases, the entire contents of the packet can be copied into a log file. These log files are then transmitted to a security monitoring system 115 for analysis and storage. Because multiple separate computers of the computer network 110 can simultaneously be transmitting log files, it can be desirable to coordinate the transmission of such files through an intermediate queuing service 112. The use of such a service enables the transformation of asynchronously generated and transmitted log files from the computer network 110 into an ordered input queue to be received by the monitoring system 115. An example of a queuing service suitable for such a purpose is the Simple Queue Service provided by Amazon Web Services. The log files can be encrypted before transmission and decrypted upon receipt at the security monitoring system 115, to provide data security.

The log files received by the monitoring system 115 are input into an ingest engine 120, which processes each log file received. For each log file, the ingest engine 120 generates a security event characterizing the log file. In some cases, multiple security events can be generated from a single log file; for example, multiple security events can be generated if a log file contains information associated with multiple different types of network activity or multiple instances of a type of network activity. A log file can contain records of multiple packets, for example, and the ingest engine 120 can generate a security event for each packet. Each security event generated by the ingest engine 120 is transmitted to a database management module 130, which stores information describing the security event in a database in a storage system 135. Database management module 130 also communicates with a plurality of service modules, such as security alerting module 140, anomaly detection module 142, and policy interface module 144. Each of these service modules communicates with the database management module 130, which provides, in response to requests, information related to security events stored in the associated database in storage system 135. The service modules each communicate with one or more user devices 150, to provide information related to network security and to receive input from the users. The security monitoring system provides a user interface 154, such as a web page, to which user devices can connect, allowing users to efficiently interact with the system. The user interface 154 provides content to the user devices 150 over a content delivery network 152, such as the internet. By interacting with the user interface 154, a user can make requests from or provide input to each of the service modules 140-144. In response to such a request or input, the user interface directs the user device to connect to the appropriate service module, which provides the requested content or receives the user's input, as appropriate. For example, the policy interface module 144 displays the user's current security policies, which are stored in database storage system 135, and allows the user to implement new security policies. Security alerting module 140 periodically accesses the database storage system 135 to determine which policies, if any, have been violated and generate corresponding security alerts, which can be transmitted to user device 150 to alert the user. The user can also connect to security alerting module 140 to review security alerts and set criteria for future alerting behavior. Anomaly detection module 142 analyzes patterns of security events stored in database storage system 135 in response to user requests, and provides conclusions related to that analysis to the user, such as a determination of whether anomalous behavior has been detected. Anomaly detection module 142 can also analyze security event patterns independent of direct user requests; for example, it can be periodically queried by security alerting module, in order to determine whether anomalous behavior warranting a security alert has been detected. To protect the security data provided to user devices 150 are themselves secure, each of the connections to service modules 140-144, as well as user interface 154, can be conducted using a secure connection protocol, such as https, for example.

Figure 2:
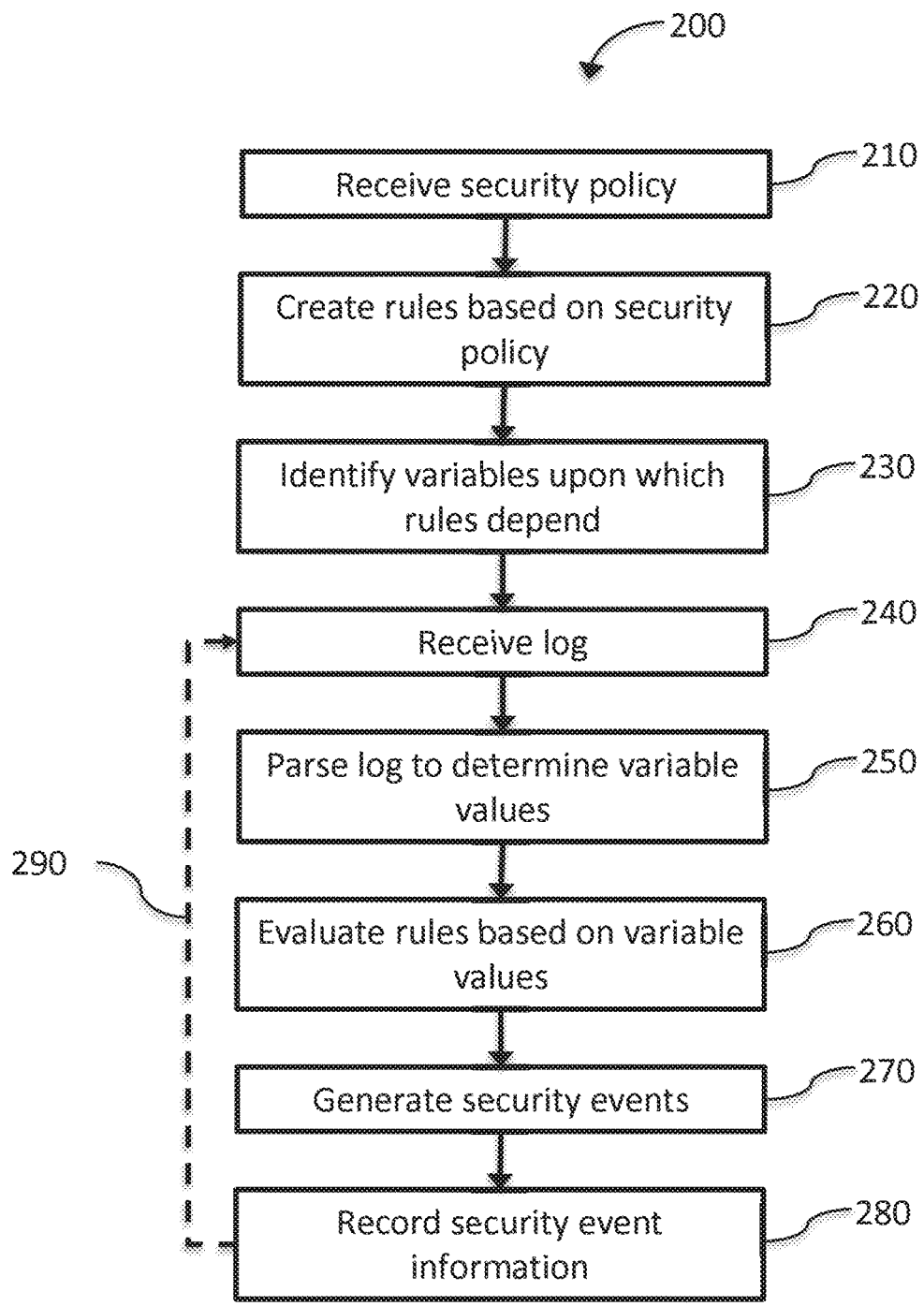
FIG. 2 illustrates an exemplary method of monitoring security policy violations in a computer network, in accordance with embodiments.

FIG. 2 illustrates a method 200 of monitoring security policy violations in a computer network. The network system architecture 100 comprises a processor and associated memory, which can be used to store instructions that, when executed by the processor, cause the processor to perform the steps of method 200. In step 210, one or more security policies are received from an entity that desires to monitor the usage of a computer network. The entity can, for example, be a financial institution, and the institution can desire monitoring of inbound connections to their computer network and/or the computer usage of their employees. The security policies can, for example, identify behaviors to be forbidden or monitored, access requests or connections to be measured, or software usage to be curtailed.

In many cases, an entity can request enforcement of a set of policies based on its rules of usage or terms of service, and such policies are often described using broad language exhibiting a general idea. For example, a bank can have a rule stating that its employees are not to use bank computers to access social media sites such as Facebook. However, implementing such a policy on a networked computer system requires greater specificity, so as to generate precise, computer-implementable instructions regarding what activities do and do not constitute a violation of such a policy. In some embodiments, the security policy can be described in ordinary language, such as a text description. For example, a policy can be stated in English as "Employees are not to visit social media sites." Such a description can be transformed into a computer-implementable rule by human programmers, for example. Alternatively or additionally, policies can be identified by selecting from among a plurality of options, such as by use of a menu-based selection system. Such a system can present a user with a plurality of common policies, optionally grouped into areas of coverage such as network usage, malware defense, software security, and access controls. Each policy can be shown with a description sufficient to make clear what actions that policy would cover; for example, a policy forbidding access to social media sites can present a list of sites for which access is to be treated as a violation of policy. The user can then select one or more presented policies that most closely matched the policies desired to be implemented. Combination of different policy identification methods can also be implemented; for example, a user can provide both a description of each policy as well as one or more identified policies representing "closest matches" to each policy. Custom modifications can then be made to more closely match the policy coverage desired; for example, a policy comprising a list of forbidden sites can be selected, with further description adding that certain sites should be added and/or removed to the list of forbidden sites.

In step 220, one or more rules are created based on the policies identified in step 210. The rules can be chosen such that many or all potential violations of a policy will correspond to a violation of at least one of the rules. In some embodiments, a rule can be chosen to identify a quantity to be measured. In some embodiments, a rule violation can not correspond precisely to a policy violation. For example, a policy can require that certain behaviors be monitored and reported; in such a case, a rule can be written such that a "violation" corresponds to an incident to be reported, such that by cataloging and reporting each rule violation, the security policy is implemented. By monitoring the violations of the one or more rules, it becomes possible to generate a summary of network activity containing sufficient information to detect security policy violations, as well as to implement network monitoring requirements.

As disclosed herein, the one or more rules can be created based on user input, such as based on a script written by a user and submitted to the security monitoring system for implementation. A specialized language can be provided to allow straightforward programming by users, and script written in that language can be automatically converted into code for implementing a corresponding rule. Each rule can be associated with one or more security policies, and further indication can be made of how a rule violation affects a security policy. For example, in some cases, a rule violation can constitute a security policy violation, while in other cases, a rule violation can actually correspond to an event that a security policy requires to be monitored. In further cases, a security policy would only be violated if a certain number of rule violations occur, or if rule violations occur at a certain rate, or follow certain patterns.

In step 230, one or more variables are identified, each variable capable of taking on a plurality of values. In some cases, the variables can be binary variables, such as a Boolean. In other cases, they can be able to take on any of a wide array of values, with some examples being integers, characters, floating-point numbers, strings, arrays, and bit fields. These variables serve as inputs for the one or more rules, such that by assigning appropriate values to the variables, the rules can be evaluated. Accordingly, the values of the variables can be assigned based on information related to the various activities taking place on the computer network.

In order to determine the values to assign to each variable, information from the computer network is obtained. This information can be obtained, for example, in the form of log files received from the computer network, according to step 240 of method 200. In some cases, the entity for which network activity is being monitored can be provided with client software, such as a virtual machine, configured to run on computers in its network. The client software generates log files—representing packets of network traffic, for example—and transmits the log files, preferably in an encrypted format, to a machine such as security monitoring system 115, which is configured to receive, decrypt, and process the log files.

The log files received in step 240 comprise information reflecting network activity of a computer network. In many cases, such information will reflect one or more network packets, such as packets sent between computers in the network, or between computers in the network and computers outside the network (such computers connected to the network via the internet). Each packet represented in the log files can be processed separately to determine its contents; in the case of a log file reflecting a plurality of packets, each packet can be evaluated independently. The initial receipt and analysis of the log file can be performed by ingest engine 120, for example.

In step 250, the log file is parsed to determine the values of variables associated with the network activity the log file represents. For example, in a log file representing a packet, the information derived from that file can include the time the packet was received, IP addresses or other identifiers for each of the sender and receiver of the packet, the direction the packet was traveling (e.g., into, out of, or within the network), the type of packet, identities of other associated packets, and/or the contents of the packet, for example. Geographical information can be associated with each IP address or other identifier, and can, for example, reflect a geographic region associated with a packet. Each such type of information can be used to assign a value to a variable, as needed to evaluate one or more rules, as defined in step 220. For example, a variable for an IP address can be assigned a value equal to an IP address of the associated packet, a variable for packet region can be assigned a value equal to a region identifier, a variable for packet size can be assigned a value calculated from the packet contents, a variable for packet type can be assigned a value based on the packet type, and a variable for packet receipt time can be assigned a value based on a packet timestamp. A variable's value can also be set by updating a previous value for that variable; for example, a variable representing a total number of packets can be incremented by 1 for each packet in the log file. In some cases, more complex rules can be used to determine a variable's value, including functions depending on a plurality of packets, a plurality of parts of packets, and/or a plurality of variable values. In some cases, one or more separate variables can be created for each log file or each packet, to allow a rule to be evaluated repeatedly for each log file or packet.

In step 260, the rules created in step 220 are evaluated, based on the values assigned in step 250 to the variables identified in step 230. The result of evaluating a rule can be a determination that the rule was violated, or alternatively that it was not violated, depending on the values of the one or more variables on which the rule depends. For this reason, it can be convenient to treat the output of a rule as a Boolean expression; for example, "true" can indicate "violated" and "false" can indicate "not violated," or vice versa.

In step 270, a security event is generated based on the rule determination in step 260. The security event summarizes the rule evaluated, and can contain such information as whether or not the rule was violated, the values of the variables, an identification of associated log files and/or packets, etc. In some cases, a security event can be generated only in response to a rule violation.

In step 280, information corresponding to the security event is recorded to a computer-readable medium, such as database storage system 135. This information can be stored for later access, and collected with information from other security events, providing users with a straightforward summary of security activity. The storage of a large number of security events also permits various forms of analysis to be automatically performed, such as anomaly detection and statistical analysis.

Furthermore, security alerts can be generated based on one or more security events. A security alert can, for example, trigger an email or other communication to a user charged with monitoring security, and the alert can for example indicate anomalous or excessive security events. Security alerts can be generated, for example, if a number of security events exceeds and/or falls below a pre-specified number. The number of security events can be a number of events in a specified amount of time, such as a minute, an hour, a day, a week, or a month. Alternatively, the number can be cumulative, and in either case the number can reset after generating the alert, to allow further alerts to be generated. In order to prevent excessive alerting, a throttle can also be provided, preventing the rate at which a security alert can be sent from exceeding a pre-defined threshold.

After completing step 280, the system optionally loops back in step 290 to receive further logs. The system thus continuously monitors the security network.

Although the above steps show method 200 of monitoring security policy violations in a computer network in accordance with embodiments, a person of ordinary skill in the art will recognize many variations based on the teaching described herein. Some of the steps can comprise sub-steps. Many of the steps can be repeated as often as beneficial to the treatment. One or more steps of the method 200 can be performed with any appropriately configured networked computer system, such as the embodiments described herein. Some of the steps can be optional, such as one or more of steps 210, 220, or 230. The order of the steps can be varied. For example, steps 250, 260, and 270 can be performed in any suitable order. Moreover, multiple iterations of the loop 290, or portions thereof, can be performed in parallel as convenient. For example, when a rule depends on a plurality of variables from a plurality of log files, a plurality of steps 240 and 250 can be performed in parallel, and their values can be combined for evaluation of the rule in step 260.

Figure 3:
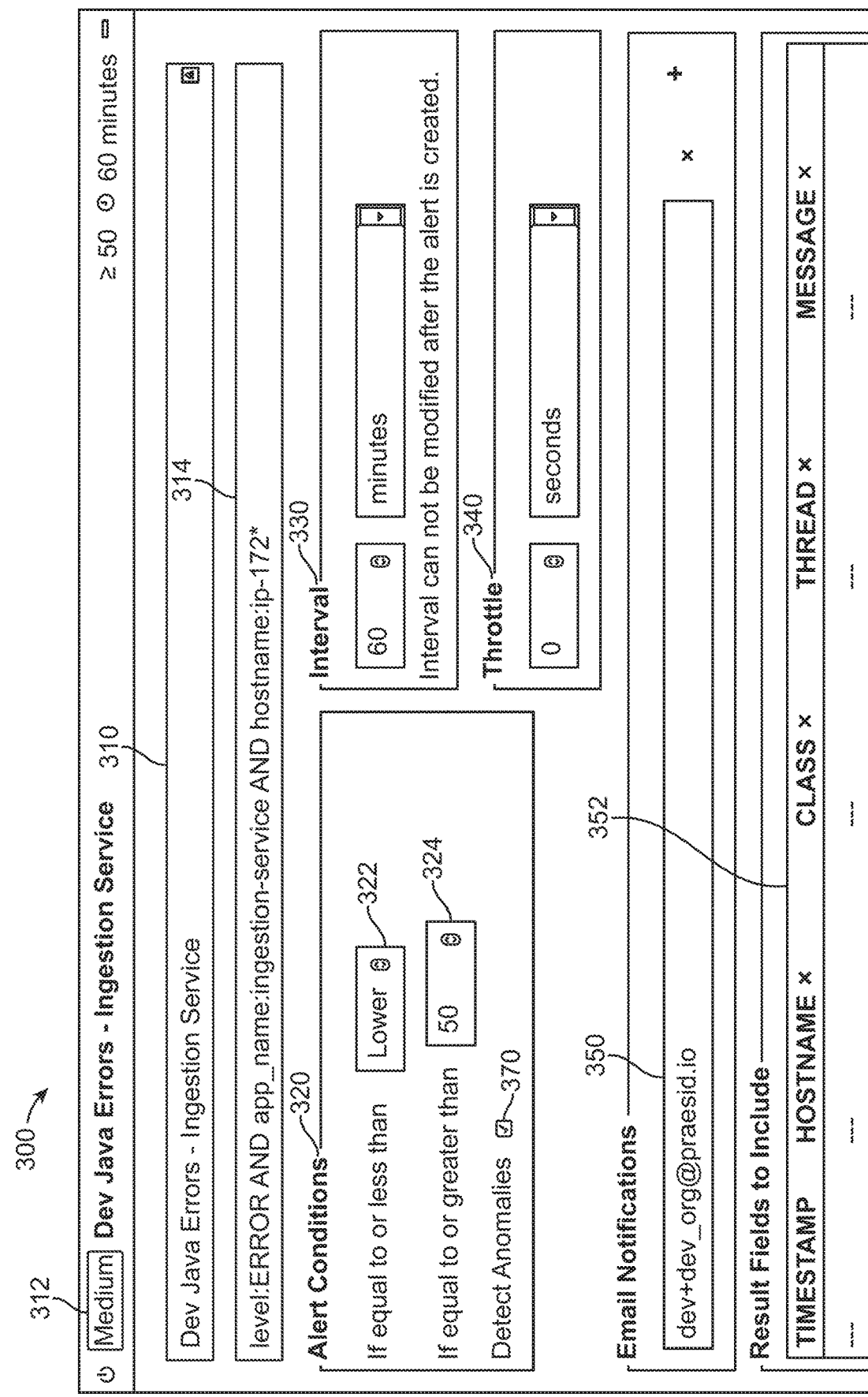
FIG. 3 illustrates an exemplary user interface for defining a rule and conditions for generating alerts based on the rule, in accordance with embodiments.

FIG. 3 illustrates a user interface 300 for defining a rule and setting conditions for alerting based on the rule. A title input box 310 is provided so that a user can provide a name that reflects the purpose of the rule. Optionally, the user can also indicate the security policies with which the rule has been associated, using a separate interface window (not shown). A rule severity 312 can further be specified by the user. The rule is defined by a rule input box 314, in which conditions are defined which, when evaluated, determine whether a rule violation has occurred. According to the illustrated rule in rule input box 314, a rule violation will occur for the illustrated rule if an error is indicated in a log file for a java app having the name "ingestion-service," but only for log files indicating an IP address corresponding to a hostname "ip-172*", meaning an IP address beginning with "172." For example, a java error message for the ingestion service coming from IP address 172.0.0.1 would be a rule violation, but the same error message coming from IP address 22.231.113.64 would not be a rule violation. A plurality of rules can be created to run in parallel by defining each rule using the illustrated interface. The commands entered in the rule input box 314 can be written using a specialized source code. To implement the rules input in the rule input box 314, the input source code is converted to machine code executable by a processor, that when executed will cause the rule to be applied as indicated, and to generate security events in response to rule violations.

In addition to allowing the creation of rules, the user interface 300 allows the user to define alert conditions 320 defining when alerts will be sent based on the number of security events corresponding to violations of the rule defined in rule input box 314. For example, an upper bound 324 and/or a lower bound 322 can be specified, in addition to a time interval 330. A security alert is generated if the number of security events in the specified time interval 330 falls outside the specified range; for example, if the number is greater than the upper bound 324 or is less than the lower bound 322. To prevent a security alert from repeatedly being generated, the system can be configured to generate an alert only once per interval 330. Further provided is a throttle 340, which sets an independent minimum delay time between security alerts; a security alert is ignored if the time since the previous security alert is less than the time specified in the throttle 340. This allows a rapid sampling interval 330 to be specified without risking a similarly rapid rate of alert generation. By contrast, setting the throttle time to 0 ensures that no potential security alert is ignored.

When a security alert is generated, an email can be sent to an email address, which can be provided in the email notification input box 350. A network administrator or other security personnel can thus be informed of security alerts quickly, permitting rapid evaluation of and response to security threats. The contents of the email can also be tailored to provide an effective summary, by choosing among a plurality of result fields 352 to include. In addition to sending an alert email when a security alert is generated, corresponding information can be recorded in a database such as database storage system 135, allowing a record to be preserved for further analysis.

In addition to generating alerts based on the number of security events per unit time, alerts can be generated based on detected anomalies in the pattern of security events. A checkbox 370 is provided to indicate whether anomaly detection should be used to generate security events. When anomaly detection is enabled, whenever the system detects an anomalous security event pattern, an alert is generated and an email is sent notifying the recipient of the anomaly detected.

Figure 4A:
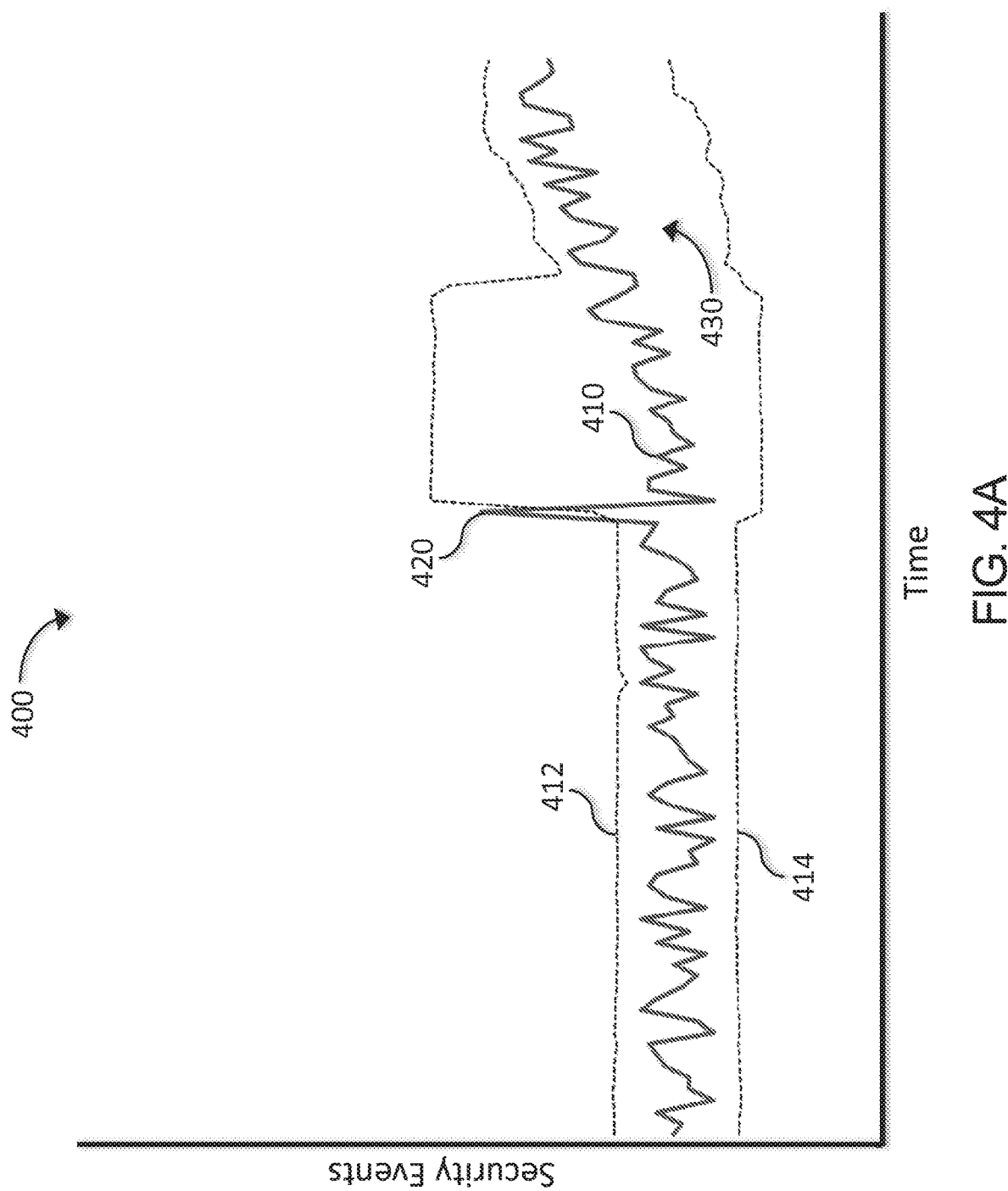
FIG. 4A provides an exemplary graphical representation of security events as a function of time, to which anomaly detection can be applied, in accordance with embodiments.

To illustrate the application of anomaly detection to detect anomalous patterns of security events, FIG. 4A provides a graphical representation 400 of security events as a function of time. Security events are recorded as a function of time, and the number of security events 410 is plotted as a function of time. The security events can be a particular class of security event, and anomaly detection can be performed simultaneously for a plurality of classes. A predicted event range is calculated statistically, based on past behavior of security events. The event range is illustrated as an upper bound 412 and a lower bound 414. The upper and lower bounds in this case are calculated on a rolling basis from a sample set containing the previous 20 measurement intervals, with the upper bound equal to the largest event number plus the standard deviation of the sample set, and the lower bound equal to the smallest event number minus the standard deviation of the sample set. (The initial range is based on previous data not shown). Accordingly, a given data point will fall outside this predicted range if it falls outside the range of the previous 20 measurements by more than a standard deviation.

As each new interval finishes, the number of security events occurring is checked to determine if it falls in the predicted event range; if the number of events falls outside, the system marks it as anomalous. Initially, the number of events remains within the upper bound 412 and lower bound 414; accordingly, no anomaly is detected. However, eventually a spike 420 occurs in the number of security events. The number of events at the spike 420 is greater than the upper bound 412, and in response the system determines an anomaly has occurred and records corresponding information to database storage system 135. If anomaly alerting has been selected, a security alert is also sent to alert network security personnel of the anomaly. At that point or later, users can access the recorded security event data, such as by viewing a graph like the one illustrated in FIG. 4A, to assess the anomaly.

After the spike 420, the upper bound 412 shifts upward for a time in response, but eventually falls back down. In the meantime, the number of security events 410 begins a gradual increase 430. The system responds by gradually increasing both the upper bound 412 and the lower bound 414, allowing the system to avoid identifying a long but gradual shift as an anomaly. This adjusting behavior is implicit in the definition of the sample set and its relation to the upper and lower bounds of the predicted event range.

Although a particular method of predicting an event range is illustrated, other variations of determining a range can be employed to tighten, loosen, or otherwise modify the range; for example: The time range of the sample set can be varied, such as by using the last 10, 100, 1000, or more intervals. The predicted range can be set proportional to a standard deviation of the sample set, for example, using a multiplier of 1, 2, 3, 4, or more; a non-integer multiplier can also be used. The range can also be predicted directly based on the upper and lower limits of the sample set; for example, as those limits plus or minus a constant. A trend line or curve can also be fit to a sample set, and used to adjust the predicted event range, to allow a more accurate accounting for smooth shifts in event rates. Further statistical estimates can also be employed, such as predictions based on a mean, skewness, or kurtosis of the sample set. One example of a model that can be used to predict event ranges is a Holt-Winters model, in which past data are exponentially smoothed to make future predictions. These options can also be combined together as desired to adjust the responsiveness of the system in detecting anomalies. Alternatively or additionally, anomaly detection can comprise comparing the number of events directly to a user-specified range, and determining an anomaly to have occurred if the number of events in an interval falls outside that range. The above-described method of security alerting employs this latter form of anomaly detection, and that checking for the alert conditions 320, and that checking the detect anomalies box 370 enables the use of both forms of detection in combination to generate security alerts.

When a security alert is generated, the system can require that security personnel respond; for example, by indicating that the alert has been acknowledged and/or that the alert has been resolved. Upon receiving such indication, a database entry can be recorded reflecting the indication, as well as a response time for alert acknowledgement and/or a triage time for alert resolution.

Figure 4B:
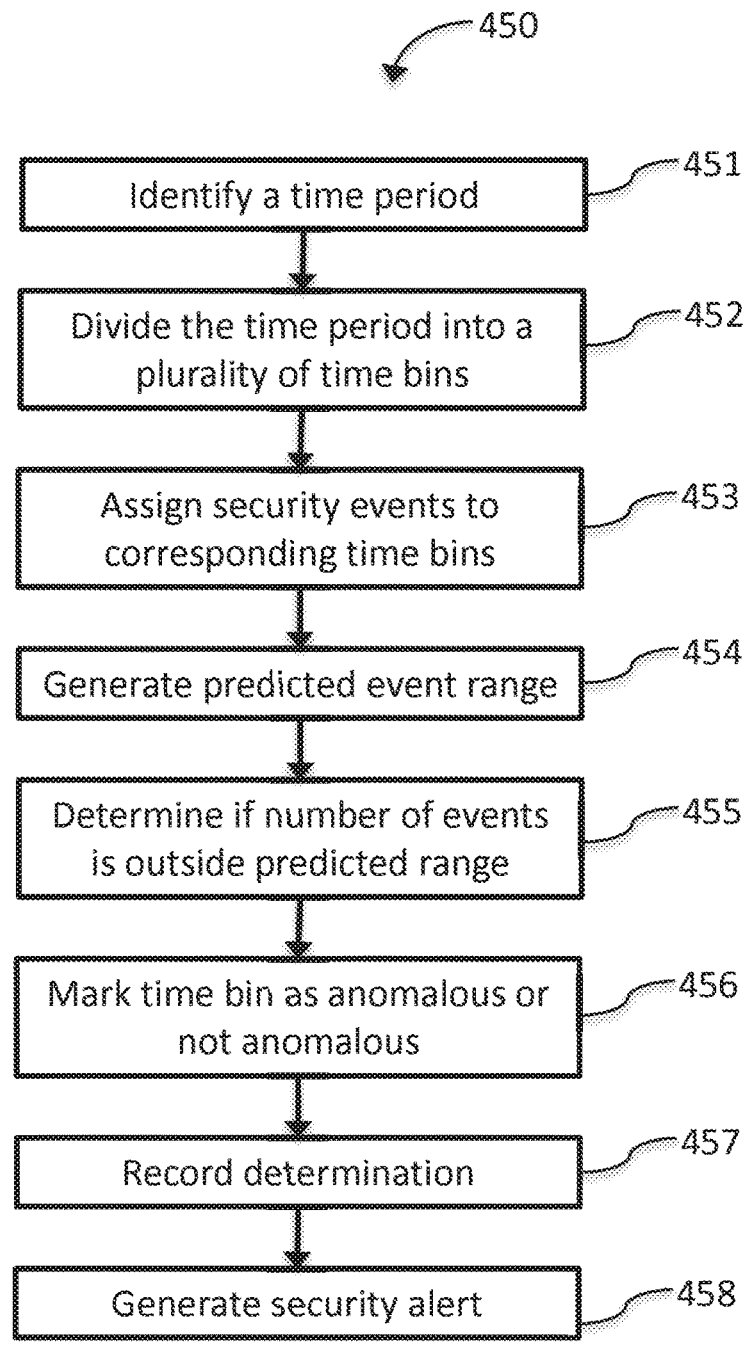
FIG. 4B illustrates an exemplary method of detecting anomalies in security event data, in accordance with embodiments.

FIG. 4B illustrates a method 450 of detecting anomalies in security event data. In step 451, a time period is identified, corresponding to the sample set of intervals from which an event range can be predicted.

In step 452, the time period is divided into a plurality of time bins. These time bins can correspond, for example, to measurement intervals for counting security events.

In step 453, security events are assigned to corresponding time bins, with each security event being assigned to a time bin corresponding to its respective timestamp. The security events can, for example, be a particular type of security event. In some embodiments, a plurality of security event types can be combined for counting, including a combination of all security events of every type occurring during the time period. One time bin—for example, the most recent time bin—is selected as the time bin to test for anomalies, based on a comparison between its number of security events and the number of events in the other time bins.

In step 454, a predicted event range is generated based on the pattern of security events assigned to each of the plurality of time bins. This prediction can be made statistically, for example, using a formula corresponding to the options described above for event range prediction.

In step 455, the number of events in the selected time bin is compared to the predicted event range to determine if the number lies inside or outside the range.

In step 456, the time bin is labeled as anomalous if the number of events lies outside the predicted range; otherwise the time bin is labeled as not anomalous.

In step 457, the determination is recorded to a computer-readable medium, thereby creating a record to aid in future analysis.

In step 458, a security alert can be generated to report a detection of an anomaly. This step can be performed or omitted based on user preferences for each security alert.

The method 450 can be performed each time a new recording interval is completed. As each new interval finishes, the method 450 can be performed to detect anomalies in the newest interval. Accordingly, method 450 can comprise an iterative loop to continuously check for anomalies.

In addition to anomaly detection and security alerting, further features are enabled by the detection and recording of security events using the methods and systems disclosed herein. For example, geographic monitoring can be performed to assess threats arising from particular geographic regions. As disclosed herein, each log file can identify an associated IP address. Based on that IP address, security events arising therefrom can be associated with a geographic region, such as a city, state, country, or continent. An IP address can also have assigned to it specific coordinates. Furthermore, data other than IP address data, such as device GPS location data, can also be used to locate the source of a security event or to confirm said location. Such location-specific security events can be treated as belonging to an independent subclass of security event, and security alerting and anomaly detection can be performed on one or more such subclasses. For example, in geographic anomaly detection, a statistical distribution of past security events associated with a geographic region can be generated for a particular time period, to generate an expected event range. Then the number of events corresponding to a particular interval can be compared to that prediction, and a determination can be made of whether the number of events falls outside the predicted range. A security alert can then be made in response, thereby informing security personnel of a geographically-specific threat to the system.

Threats can also be monitored within the network, in a manner similar to geographic threat tracking. The network can be divided into a plurality of segments, and a network topology can be generated, assigning each computer in the network to a segment of the plurality of segments. The topology can also indicate the interconnections between computers, and more broadly between segments of the network. Threats can then be located to particular segments: for example, one threat can indicate it is associated with a segment corresponding to a publically-accessible website hosted in the network, while another threat can indicate it is associated with a segment corresponding to servers assigned to deal with customer financial data. Different alerts can then be generated based on these different threats, and messages can be sent to an appropriate network administrator.

Higher-level rules can also be employed by users to manage security events. For example, each security event generated can then be queried against a number of classifying queries before entering the system's database. The classifying queries can be provided by the user as a filter to determine how to handle security events by class. For example, the system can be instructed to take actions such as adding metadata to a security event, rewriting the security event, dropping the security event, or sending an alert based on the event. The action chosen by the system can be determined by user-provided criteria, and can depend on the contents of the event. For example, a user can instruct the system to drop all security events related to a particular segment of the network, while adding metadata to security events associated with network user access of forbidden sites, indicating which URL was input by the network user.

The detection and collection of security events in a standardized format can also be used to generate statistical pictures of networks, allowing comparisons of network security and network threats to be made between otherwise disparate networks. For example, statistical information related to security events can be generated in a network. A summary report can then be made for network users to inform them for security trends and performance. Examples of report contents can include a response rate of security personnel to security events, a number of security events per security policy, a number of security alerts per security policy, and/or a percentage of policies covered by rules. Improvements can be suggested to users based on the report; for example, if only a low percentage of policies are covered by rules, more rules can be generated and associated with corresponding policies, so as to increase policy coverage.

By generating such statistical information for a plurality of networks, the comparison of those networks is enabled, by comparing the statistical information of the plurality of networks. For example, peaks in security events of similar or disparate types can be correlated between networks to allow detection of distributed threats. The effectiveness of security can also be compared between networks; for example, networks can be ranked based on any of a variety of statistical categories. Among these possible categories are triage time, which can represent the time spent to solve security problems; a response rate, which can represent a rate at which security events or alerts are acknowledged; a number of security events per unit time; or a number of security alerts per unit time. Because security events can be defined in a consistent, objective manner between different networks, the comparison of their statistical distributions provides a more reliable, objective assessment for inter-network comparison.

To monitor the performance of periodic security duties, the system disclosed herein can comprise a scheduling system. One or more security tasks can be identified as tasks to be periodically performed. Examples of such tasks include reviewing security logs, updating security policies, reviewing policy coverage, confirming conformance of rules with intended policies, and viewing summaries of security event data. A repetition period for the security task can be identified, and in response the system can generate notifications to perform the security task, sending such notifications at a rate of one notification per repetition period. For each notification, a user is required to perform the associated security task. The user can then acknowledge the performance of that task, and a record can be generated in response to the acknowledgement. This record can then be used to confirm that security tasks are being performed in accordance with requirements of one or more security policies.

Figure 5:
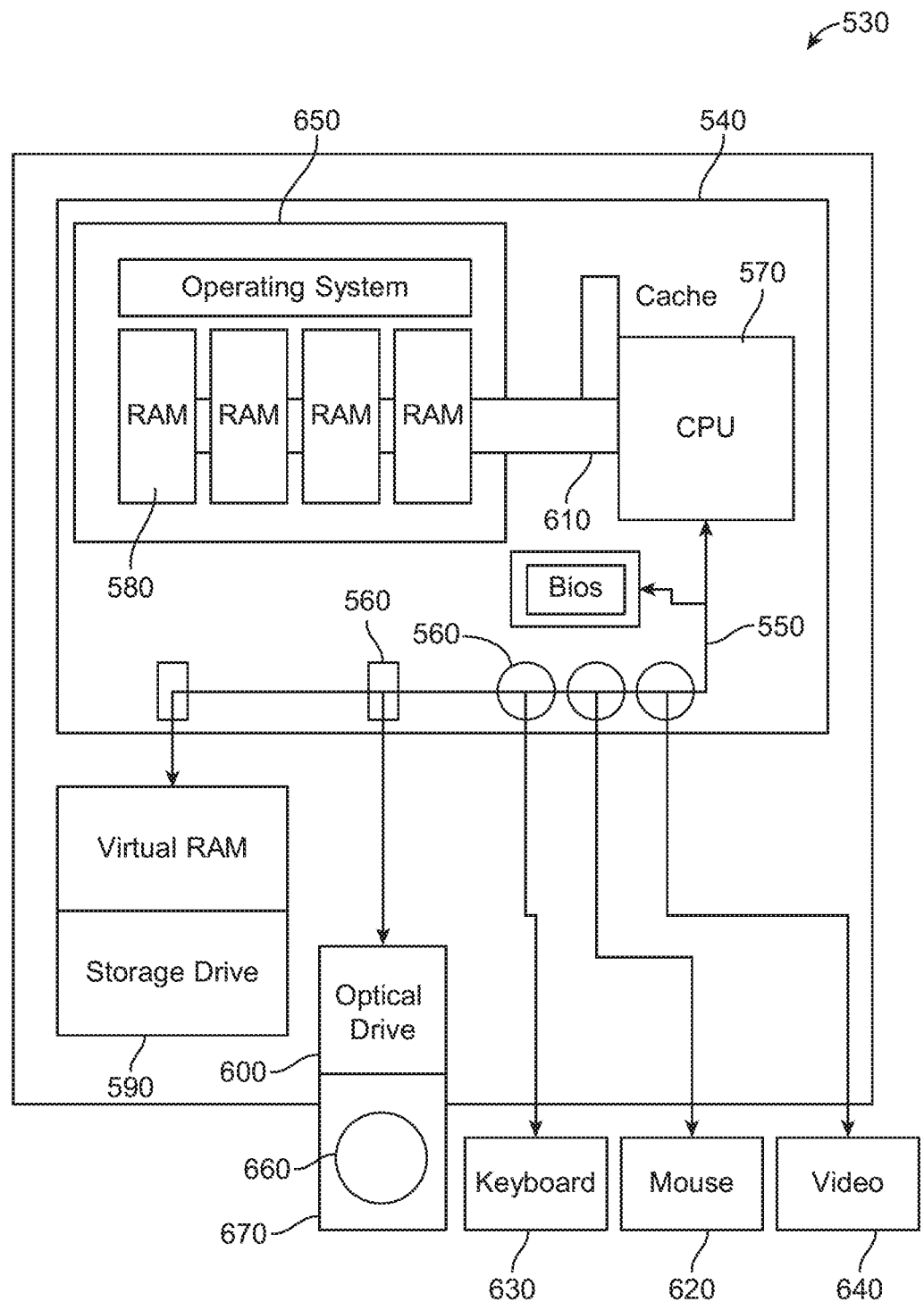
FIG. 5 illustrates an exemplary computer system configured to perform the functions of systems and methods described herein, in accordance with embodiments.

As described in detail herein, network security monitoring systems and methods can be implemented on a computer system. For example, FIG. 5 illustrates a high level block diagram of a computer system 530 which can be used to perform embodiments of the processes disclosed herein, including but not limited to processes 210 and 390, data storage and retrieval functions of the file transfer server 130. It can be appreciated that in some embodiments, the system performing the processes herein can include some or all of the computer system 530. In some embodiments, the computer system 530 can be linked to or otherwise associated with other computer systems 530, including those in the networked system 100, such as via a network interface (not shown). In an embodiment, the computer system 530 has a case enclosing a main board 540. The main board has a system bus 550, connection ports 560, a processing unit, such as Central Processing Unit (CPU) 570, and a data storage device, such as main memory 580, storage drive 590, and optical drive 600. Each of main memory 580, storage drive 590, and optical drive 600 can be of any appropriate construction or configuration. For example, in some embodiments storage drive 590 can comprise a spinning hard disk drive, or can comprise a solid-state drive. Additionally, optical drive 600 can comprise a CD drive, a DVD drive, a Blu-ray drive, or any other appropriate optical medium.

Memory bus 610 couples main memory 580 to CPU 570. The system bus 550 couples storage drive 590, optical drive 600, and connection ports 560 to CPU 570. Multiple input devices can be provided, such as for example a mouse 620 and keyboard 630. Multiple output devices can also be provided, such as for example a video monitor 640 and a printer (not shown). In an embodiment, such output devices can be configured to display information regarding the processes disclosed herein, including but not limited to a graphical user interface facilitating the file transfers, as described in greater detail below. The input devices and output devices can alternatively be local to the computer system 530, or can be located remotely (e.g., interfacing with the computer system 530 through a network or other remote connection).

Computer system 530 can be a commercially available system, or can be proprietary design. In some embodiments, the computer system 530 can be a desktop workstation unit, and can be provided by any appropriate computer system provider. In some embodiments, computer system 530 comprise a networked computer system, wherein memory storage components such as storage drive 590, additional CPUs 570 and output devices such as printers are provided by physically separate computer systems commonly tied together in the network (e.g., through portions of the networked system 100). Those skilled in the art will understand and appreciate the physical composition of components and component interconnections comprising computer system 530, and select a computer system 530 suitable for performing the methods disclosed herein.

When computer system 530 is activated, preferably an operating system 650 will load into main memory 580 as part of the boot sequence, and ready the computer system 530 for operation. At the simplest level, and in the most general sense, the tasks of an operating system fall into specific categories—process management, device management (including application and user interface management) and memory management.

In such a computer system 530, the CPU 570 is operable to perform one or more methods of the systems, platforms, components, or modules described herein. Those skilled in the art will understand that a computer-readable medium 660, on which is a computer program 670 for performing the methods disclosed herein, can be provided to the computer system 530. The form of the medium 660 and language of the program 670 are understood to be appropriate for computer system 530. Utilizing the memory stores, such as one or more storage drives 590 and main system memory 580, the operable CPU 570 will read the instructions provided by the computer program 670 and operate to perform the methods disclosed herein.

In an embodiment, one or more of the computer program modules can be configured to transmit, for viewing on an electronic display such as the video monitor 640 communicatively linked with the CPU 570, a graphical user interface (which can be interacted with using the mouse 620 and/or keyboard 630). In some embodiments, the user can interact with the computing system using a touch screen; for example, for computing systems running on mobile devices or using touch screen displays.

The specific dimensions of any of the apparatuses, devices, systems, and components thereof, of the present disclosure can be readily varied depending upon the intended application, as will be apparent to those of skill in the art in view of the disclosure herein. Moreover, it is understood that the examples and embodiments described herein are for illustrative purposes only and that various modifications or changes in light thereof can be suggested to persons skilled in the art and are included within the spirit and purview of this application and scope of the appended claims. Numerous different combinations of embodiments described herein are possible, and such combinations are considered part of the present disclosure. In addition, all features discussed in connection with any one embodiment herein can be readily adapted for use in other embodiments herein. The use of different terms or reference numerals for similar features in different embodiments does not necessarily imply differences other than those expressly set forth. Accordingly, the present disclosure is intended to be described solely by reference to the appended claims, and not limited to the embodiments disclosed herein.

Unless otherwise specified, the presently described methods and processes can be performed in any order. For example, a method describing steps (a), (b), and (c) can be performed with step (a) first, followed by step (b), and then step (c). Or, the method can be performed in a different order such as, for example, with step (b) first followed by step (c) and then step (a). Furthermore, those steps can be performed simultaneously or separately unless otherwise specified with particularity.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention. It is intended that the following claims define the scope of the invention and that methods and structures within the scope of these claims and their equivalents be covered thereby.

What is claimed is:

1. A method for monitoring security policy violations in a computer network, the method comprising:
   creating a rule corresponding to a security policy;
   determining a plurality of variables from the rule, wherein at least one variable of the plurality of variables is enabled to be set to one of a plurality of values, and wherein the rule is violated or not violated conditional on values of the plurality of variables;
   receiving a plurality of logs representing packets of traffic transmitted via the computer network;
   parsing a first log of the plurality of logs to determine a value of a first variable of the plurality of variables;
   parsing a second log of the plurality of logs to determine a value of a second variable of the plurality of variables;

evaluating the rule conditional on the value of the first variable and the value of the second variable;

identifying a rule violation corresponding to the value of the first variable, the value of the second variable, and the rule;

generating a security event corresponding to the rule violation;

recording information representing the security event to a computer-readable storage medium;

assigning the security event into a time bin of a plurality of time bins;

determining that a count of security events in the time bin does not fall within a predicted event range; and in response to the count of security events not falling within the predicted event range, generating a security alert.

2. The method of claim 1, wherein the security event comprises a plurality of security events.

3. The method of claim 2, further comprising recording a time associated with each security event of the plurality of security events.

4. The method of claim 3, further comprising checking for an anomaly.

5. The method of claim 4, wherein checking for an anomaly comprises:
    (a) identifying a time period;
    (b) dividing the time period into the plurality of time bins;
    (c) assigning each of the plurality of security events to a corresponding time bin;
    (d) determining a number of security events assigned to each of the plurality of time bins;
    (e) generating the predicted event range for the time bin of the plurality of time bins based on a pattern of security events assigned to each of the plurality of time bins earlier than the time bin; and
    (f) marking the time bin as anomalous when the number of security events assigned to the time bin does not fall within the predicted event range.

6. The method of claim 4, wherein checking for an anomaly comprises:
    (a) identifying a time period;
    (b) dividing the time period into the plurality of time bins;
    (c) assigning each of the plurality of security events to a corresponding time bin;
    (d) determining a number of security events assigned to each of the plurality of time bins; and
    (e) marking the time bin as anomalous if the number of security events assigned to the time bin does not fall within a user-defined event range; otherwise marking the time bin as not anomalous.

7. The method of claim 1, further comprising determining a geographic coordinate for an IP address in one of the plurality of logs, and associating the geographic coordinate with the IP address.

8. The method of claim 7, further comprising:
    (a) identifying a plurality of geographic regions;
    (b) associating each security event with a respective geographic region of the plurality of geographic regions based on the geographic coordinate;
    (c) identifying a time period;
    (d) generating, from a statistical distribution of past security events associated with each geographic region of the plurality of geographic regions, an expected range of security events for the time period; and
    (e) determining that a number of security events occurring within the time period and associated with a particular geographic region of the plurality of geographic regions lies outside the expected range.

9. The method of claim 8, further comprising generating the security alert indicating that the number of security events occurring within the time period and associated with the geographic region lies outside the expected range.

10. The method of claim 1, further comprising collecting statistical information related to a plurality of security events.

11. The method of claim 10, further comprising generating a report based on the statistical information, wherein the report reflects at least one of a response rate, a number of security events per security policy, a number of security alerts per security policy, or a percentage of policies covered by rules.

12. The method of claim 10, further comprising comparing the statistical information with one or more sets of statistical information relating to other networks.

13. The method of claim 12, further comprising ranking the network in relation to the other networks based on one or more statistical categories.

14. The method of claim 13, wherein the one or more statistical categories comprise a triage time, a response rate, a number of security events per unit time, or a number of security alerts per unit time.

15. The method of claim 1, wherein the information representing the security event comprises an IP address or a host name, and wherein recording the information comprises adding the information to a relational database.

16. The method of claim 15, wherein the relational database indicates which IP addresses or host names were identified in each of a plurality of days.

17. The method of claim 1, further comprising receiving a network topology identifying one or more segments of the network.

18. The method of claim 1, further comprising querying the security event against one or more classifying queries.

19. The method of claim 18, further comprising taking one or more specified actions based on the classifying query, wherein the one or more specified actions comprise adding metadata to the security event, rewriting the security event, dropping the security event, or sending an alert related to the security event.

20. The method of claim 1, further comprising:
    (a) identifying a security task to be periodically performed;
    (b) identifying a repetition period for the security task;
    (c) generating, in a plurality of repetition periods, a plurality of notifications to perform the security task, at a rate of one notification per repetition period;
    (d) receiving user input for each of the plurality of repetition periods indicating whether the security task has been performed for that repetition period; and
    (e) recording to a computer-readable medium, for each of the plurality of repetition periods, information indicating whether the security task has been performed in that repetition period.

21. The method of claim 20, wherein the security task to be periodically performed is identified via a first received input and the repetition period for the security task is identified based on a second received input.

* * * * *